(12) United States Patent
Lim et al.

(10) Patent No.: US 7,956,910 B2
(45) Date of Patent: Jun. 7, 2011

(54) APPARATUS AND METHOD FOR CORRECTING IMAGE EDGE

(75) Inventors: Jae-guyn Lim, Yongin-si (KR); Won-hee Choe, Gyeongju-si (KR); Seong-deok Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 745 days.

(21) Appl. No.: 11/822,157

(22) Filed: Jul. 2, 2007

(65) Prior Publication Data
US 2008/0012968 A1   Jan. 17, 2008

(30) Foreign Application Priority Data

Jul. 3, 2006 (KR) .................. 10-2006-0062082

(51) Int. Cl.
*G06K 9/40* (2006.01)
*H04N 7/34* (2006.01)
(52) U.S. Cl. .............. 348/252; 348/222.1; 382/266
(58) Field of Classification Search .............. None
See application file for complete search history.

(56) References Cited

U.S. PATENT DOCUMENTS

| 5,742,410 A * | 4/1998 | Suzuki ............ 358/518 |
| 6,774,943 B1 | 8/2004 | Kao et al. |
| 2005/0175236 A1 * | 8/2005 | Piepers ............ 382/162 |

FOREIGN PATENT DOCUMENTS

| CN | 1627792 A | 6/2005 |
| CN | 1659895 A | 8/2005 |
| CN | 1694507 A | 11/2005 |
| JP | 2000013642 A * | 1/2000 |
| KR | 1999-012650 | 2/1999 |
| KR | 2003-0090143 | 11/2003 |
| KR | 10-2004-0058006 | 7/2004 |

OTHER PUBLICATIONS

Chinese Office Action issued on Apr. 3, 2009 in corresponding Chinese Patent Application 200710126914.2.

* cited by examiner

*Primary Examiner* — David L Ometz
*Assistant Examiner* — Angel L Garces-Rivera
(74) *Attorney, Agent, or Firm* — Staas & Halsey LLP

(57) ABSTRACT

An apparatus and method for correcting an edge are provided. The apparatus includes a luminance corrector obtaining a corrected luminance value of a center pixel in a first window of a predetermined size, the first window located at the edge of the input image, by using weights assigned according to a luminance difference between the center pixel and each of a plurality of adjacent pixels in the first window or a predetermined difference of variance (DoV) value representing the degree of uniformity in the luminance between the center pixel and each of the plurality of adjacent pixels; and a chrominance corrector correcting a chrominance value of the edge using weights assigned according to a luminance difference between a center pixel and a plurality of adjacent pixels to the center pixel in a second window of a predetermined size based on the corrected luminance value.

27 Claims, 17 Drawing Sheets

INPUT IMAGE

| Y12'-Y0' | Y12'-Y1' | Y12'-Y2' | ... | |
|---|---|---|---|---|
| ... | ... | | | |
| ... | | | | |
| | | | | |
| | | | | |

1000                                                          600

| W0  | W1  | W2  | W3  | W4  |
|-----|-----|-----|-----|-----|
| W5  | W6  | W7  | W8  | W9  |
| W10 | W11 | W12 | W13 | W14 |
| W15 | W16 | W17 | W18 | W19 |
| W20 | W21 | W22 | W23 | W24 |

| Y0  | Y1  | Y2  | Y3  | Y4  |
|-----|-----|-----|-----|-----|
| Y5  | Y6  | Y7  | Y8  | Y9  |
| Y10 | Y11 | Y12 | Y13 | Y14 |
| Y15 | Y16 | Y17 | Y18 | Y19 |
| Y20 | Y21 | Y22 | Y23 | Y24 |

LUMINANCE FOR CENTER PIXEL − LUMINANCE FOR ADJACENT PIXEL

| 1200 | | | | 1100-2 | | |
|---|---|---|---|---|---|---|
| W'0 | W'1 | W'2 | | Cr0 | Cr1 | Cr2 |
| W'3 | W'4 | W'5 |  | Cr3 | Cr4 | Cr5 |
| W'6 | W'7 | W'8 | | Cr6 | Cr7 | Cr8 |

APPARATUS AND METHOD FOR CORRECTING IMAGE EDGE

CROSS-REFERENCE TO RELATED APPLICATIONS

This application claims priority from Korean Patent Application No. 10-2006-0062082 filed on Jul. 3, 2006 in the Korean Intellectual Property Office, the disclosure of which is incorporated herein by reference in its entirety.

BACKGROUND OF THE INVENTION

1. Field of the Invention

The present invention relates to an apparatus and method for correcting an edge of an image, and more particularly, to an apparatus and method for correcting an edge of an image that can provide a vivid image by detecting an edge of an image and correcting luminance and chrominance values of the detected edge.

2. Description of the Related Art

As digital imaging devices such as digital still cameras or digital camcorders continue to increase in popularity, various techniques such as edge detection and edge enhancement through correction of chrominance signals Cr and Cb are being used to make an image photographed by a digital imaging device more vivid.

FIG. 1 illustrates conventional edge correction. When an edge region 10 ("edge") in a degraded image 20 is highly enhanced using conventional techniques as illustrated in FIG. 1, a noisy image 22 is created and color fringe defects that are observable in a high frequency region 12 are sharply enhanced by intensifying the non-continuous characteristics of the edge.

Thus, there is a need to improve the sharpness of an image by reducing defects that may occur when an edge of an image is highly enhanced and effectively correcting edge information of the image.

SUMMARY OF THE INVENTION

Additional aspects and/or advantages of the invention will be set forth in part in the description which follows and, in part, will be apparent from the description, or may be learned by practice of the invention.

The present invention provides an apparatus and method for correcting an edge of an image. The above and embodiment objects of the present invention will be described in or be apparent from the following description of the preferred embodiments.

According to an aspect of the present invention, there is provided an apparatus for correcting an edge in an input image including a luminance corrector obtaining a corrected luminance value of a center pixel in a first window of a predetermined size, the first window located at the edge of the input image, by using weights assigned according to a luminance difference between the center pixel and each of a plurality of adjacent pixels in the first window or a predetermined difference of variance (DoV) value representing the degree of uniformity in the luminance between the center pixel and each of the plurality of adjacent pixels; and a chrominance corrector correcting a chrominance value of the edge using weights assigned according to a luminance difference between a center pixel and a plurality of adjacent pixels to the center pixel in a second window of a predetermined size based on the corrected luminance value.

According to another aspect of the present invention, there is provided a method for correcting an edge in an input image, including obtaining a corrected luminance value of a center pixel in a first window of a predetermined size on the edge of the input image by using weights assigned according to a luminance difference between the center pixel and a plurality of adjacent pixels to the center pixel or a difference in a predetermined value representing the degree of luminance uniformity between the center pixel and the plurality of adjacent pixels; and correcting a chrominance value of the edge using weights assigned according to a luminance difference between a center pixel and a plurality of adjacent pixels to the center pixel in a second window of a predetermined size on the edge having the corrected luminance value.

BRIEF DESCRIPTION OF THE DRAWINGS

These and/or other aspects and advantages of the invention will become apparent and more readily appreciated from the following description of the embodiments, taken in conjunction with the accompanying drawings of which:

FIGS. 6A-7B illustrate a process of assigning a weight to a first mask according to a luminance difference between a center pixel in a window and its adjacent pixels according to an embodiment of the present invention;

FIGS. 8A-9B illustrate a process of assigning a weight to a second mask according to a difference in difference of variation (DoV) between a center pixel in a window and its adjacent pixels according to an embodiment of the present invention;

DETAILED DESCRIPTION OF THE PREFERRED EMBODIMENTS

Figure 1:
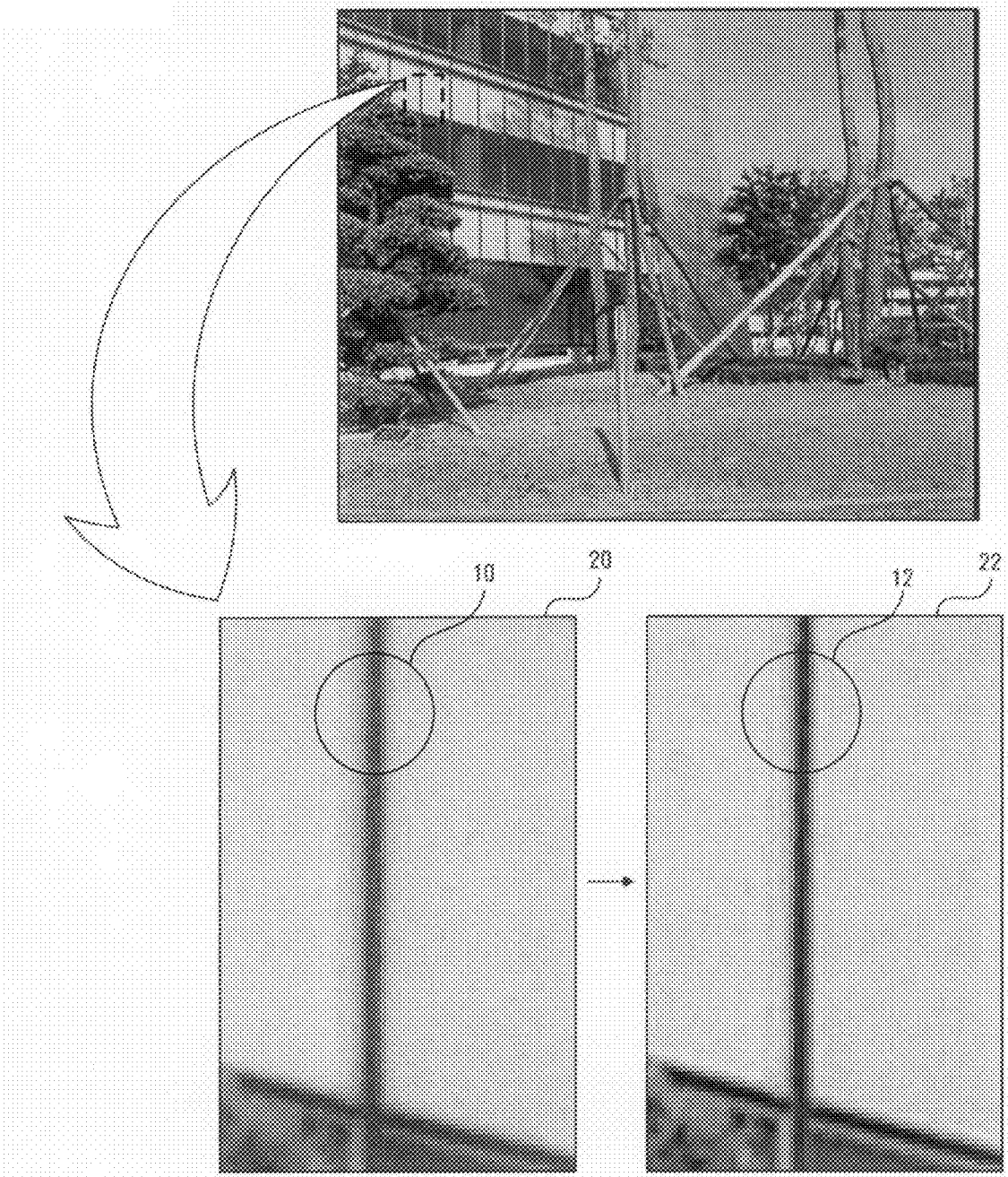
FIG. 1 illustrates conventional edge correction.

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

The present invention will now be described more fully with reference to the accompanying drawings, in which preferred embodiments of the invention are shown.

Figure 2:
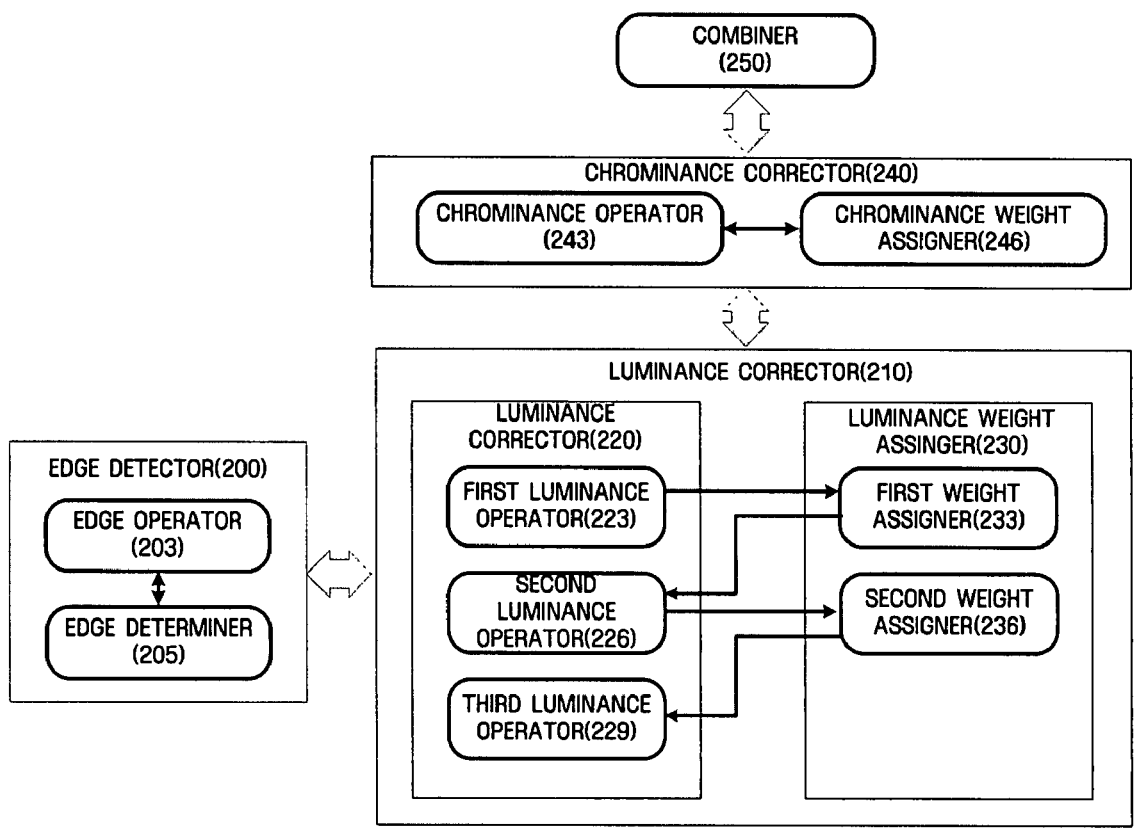
FIG. 2 is a block diagram of an edge correction apparatus according to an embodiment of the present invention.

FIG. 2 is a block diagram of an edge correction apparatus 100 according to an embodiment of the present invention. Referring to FIG. 2, the edge correction apparatus 100 includes an edge detector 200, a luminance corrector 210, a chrominance corrector 240, and a combiner 250. The edge correction apparatus 100 can be applied to an imaging device such as a digital still camera or digital camcorder. The edge detector 200 detects an edge of an input image and includes an edge operator 203 and an edge determiner 205. In another embodiment, when a conventional image processing method using, for example, homogeneity operators, difference operators, or compass gradient operators, is used for detection of an edge, the edge correction apparatus 100 may not include the edge detector 200. According to an aspect of the present invention, the edge operator 203 and the edge determiner 205 are used to detect an edge of an input image.

The edge operator 203 performs operations on the values of luminance signals Y ("luminance") of a plurality of pixels in a window of an input image and on respective coefficients in a mask having the same size as the window, which are assigned to the respective pixels. Here, the window has a predetermined size. More specifically, the edge operator 203 multiplies coefficients of a predetermined mask, which are assigned to respective pixels, by luminance values Y of respective pixels in a window corresponding to the mask, and adds the resulting values together. When there is a plurality of masks, the edge operator 203 calculates a difference between a maximum value MAX and a minimum value MIN of a plurality of sums and determines an absolute value of the difference.

The edge determiner 205 compares the absolute-value difference obtained by the edge operator 203 with a predetermined threshold and determines whether the window is located at the edge of the input image. More specifically, when the absolute-value difference is greater than the threshold, the edge determiner 205 determines that the window is located at the edge of the input image. When the absolute-value difference is less than the threshold, the edge determiner 205 determines that the window is a planar region (not shown). The planar region refers to a region having a uniform distribution of luminance values.

Thus, the edge detector 200 detects the edge of the input image according to the result obtained by the edge determiner 205. The process of detecting an edge in the edge detector 200 will be described in more detail later with reference to FIGS. 5A-5C.

The luminance corrector 210 includes a luminance operator 220 and a luminance weight assigner 230. The luminance operator 220 corrects a luminance value for the edge using weights assigned according to a luminance difference between a center pixel in a window of a predetermined size located on an edge and each of a plurality of its adjacent pixels in the window or a difference in a predetermined value representing the degree of luminance uniformity there between. The luminance weight assigner 230 assigns a weight to a mask according to the result obtained by the luminance operator 220. The luminance operator 220 includes first through third luminance operators 223, 226, and 229. The luminance weight assigner 230 includes first and second weight assigners 233 and 236. The function and operation of each of the components corresponding to each operation of an edge correction method will be described in more detail as follows.

The first luminance operator 223 performs an operation on the luminance values of a center pixel and on adjacent pixels to the center pixel in the window. More specifically, the first luminance operator 223 calculates a difference between the luminance value of the center pixel in the window and the luminance value of each of the adjacent pixels. The center pixel is positioned at the center of the window and will be subjected to edge correction. The adjacent pixels are pixels in the window other than the center pixel.

The first weight assigner 233 assigns a predetermined weight to a first mask 700 (see FIG. 7B) according to the difference between the luminance values of the center pixel and adjacent pixels in the window obtained by the first luminance operator 223. In this case, the first weight assigner 233 may assign a low weight to an adjacent pixel having an absolute value of a luminance difference from the center pixel, which is greater than a predetermined threshold, and a high weight to an adjacent pixel having an absolute value of a luminance difference from the center pixel, which is less than the threshold. In this manner, an adjacent pixel with a luminance value close to that of the center pixel can largely affect correction of luminance value of the center pixel.

The second luminance operator 226 moves a center pixel in a sub-window having a predetermined size so that it corresponds to a predetermined pixel in a window located at the edge and performs an operation on the luminance values of the center pixel and adjacent pixels in the sub-window. More specifically, the second luminance operator 226 moves a center pixel in a 3×3 sub-window so that it corresponds to a first pixel in a window located at the edge, calculates a difference between the luminance value of the center pixel in the sub-window and the luminance value of each of its adjacent pixels in the sub-window, and adds the differences together to obtain the resulting value for the first pixel in the window. The second luminance operator 226 performs the same operations on all the remaining pixels in the window. The resultant values obtained by the second luminance operator 226 are difference of variation (DoV) values indicating the degree of uniformity of the luminance values of the pixels in the window. A low DoV value means that a pixel in a window is located at a planar region of uniform luminance. A high DoV value means that a pixel in the window is located at a non-planar region of non-uniform luminance. The second luminance operator 226 then calculates a difference between the DoV value of the center pixel in the window and the DoV value of each of its adjacent pixels.

The second weight assigner 236 assigns a predetermined weight to a second mask 900 according to a difference between the DoV values of the center pixel and adjacent pixels in the window obtained by the second luminance operator 226. In this case, the second weight assigner 236 may assign a high weight to an adjacent pixel having a difference in the DoV value from the center pixel greater than a predetermined threshold and a low weight to an adjacent pixel having the difference in the DoV value from the center pixel less than the threshold. An adjacent pixel having a large difference in the DoV value from the center pixel in the window represents a planar region having more uniform luminance than the center pixel. An adjacent pixel having a small difference in the DoV value from the center pixel represents a non-planar region having more non-uniform luminance than the center pixel. Thus, the second weight assigner 236 assigns a high weight to an adjacent pixel at a planar region having more uniform luminance than the center pixel in the window so that the adjacent pixel can largely affect correction of the luminance value of the center pixel. Conversely, the second weight assigner 236 assigns a low weight to an adjacent pixel at a non-planar region having more non-uniform luminance than the center pixel in the window so that the adjacent pixel can slightly affect correction of the luminance value of the center pixel. In this manner, the luminance value of the center pixel in the window can be made uniform like in the planar region.

Figures 9A, 9B:
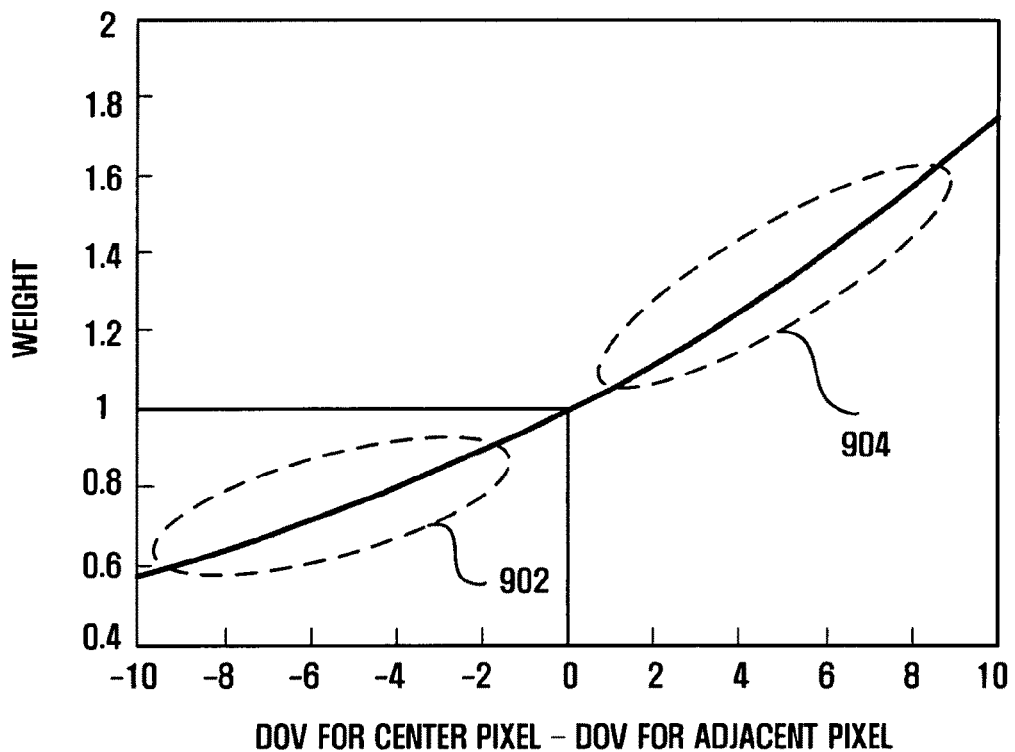

The third luminance operator 229 performs an operation on weights assigned to pixels in the first mask and their corresponding pixels in the second mask. For example, the third luminance operator 229 multiplies a weight W0' for a first pixel in the first mask 700 by a weight W0" for a first pixel in the second mask 900 (FIG. 9B) to obtain a coefficient for a first pixel in a third mask 1000 which will be described later.

Thus, the luminance corrector 210 performs a predetermined operation on the pixel coefficients of the third mask 1000 obtained by the third luminance operator and on a luminance value for a pixel in the window corresponding to each pixel in the third mask 1000 and obtains a corrected luminance value for the center pixel in the window. The function and operation of the luminance corrector 210 will be described in more detail later with reference to FIGS. 6A-10B.

The chrominance corrector 240 corrects a chrominance value for the edge using weights assigned according to a difference between a center pixel in a window of a predetermined size located on the edge having the corrected luminance value and each of a plurality of its adjacent pixels in the window. The chrominance corrector 240 includes a chrominance operator 243 and a chrominance weight assigner 246.

The chrominance operator 243 performs an operation on the values of a center pixel and on adjacent pixels to the center pixel in the window located at the edge having the corrected luminance value.

The chrominance weight assigner 246 assigns a predetermined weight to a fourth mask 1200 according to the difference between the luminance values of the center pixel and adjacent pixels in the window obtained by the chrominance operator 243. In this case, the chrominance weight assigner 246 assigns a low or zero weight to an adjacent pixel at almost the same position as the center pixel in the window so that the adjacent pixel can slightly affect correction of chrominance value of the center pixel, thus minimizing an internal color fringe error.

The chrominance corrector 240 performs a predetermined operation on chrominance values for each pixel in the fourth mask 1200 and on its corresponding pixel in the window and obtains the corrected chrominance value of the center pixel in the window.

The combiner 250 performs an operation on the corrected luminance value and on the corrected chrominance value for the edge to obtain the entire corrected YCrCb domain for the edge. The combiner 250 may further enhance the edge by adding undershoot and overshoot to low- and high-luminance areas, respectively, using conventionally known techniques. The combiner 250 also converts the YCrCb domain to a RGB domain and outputs the RGB domain image.

Meanwhile, each of the components shown in FIG. 2 may be a 'module'. The term 'module', as used herein, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

Figure 3:
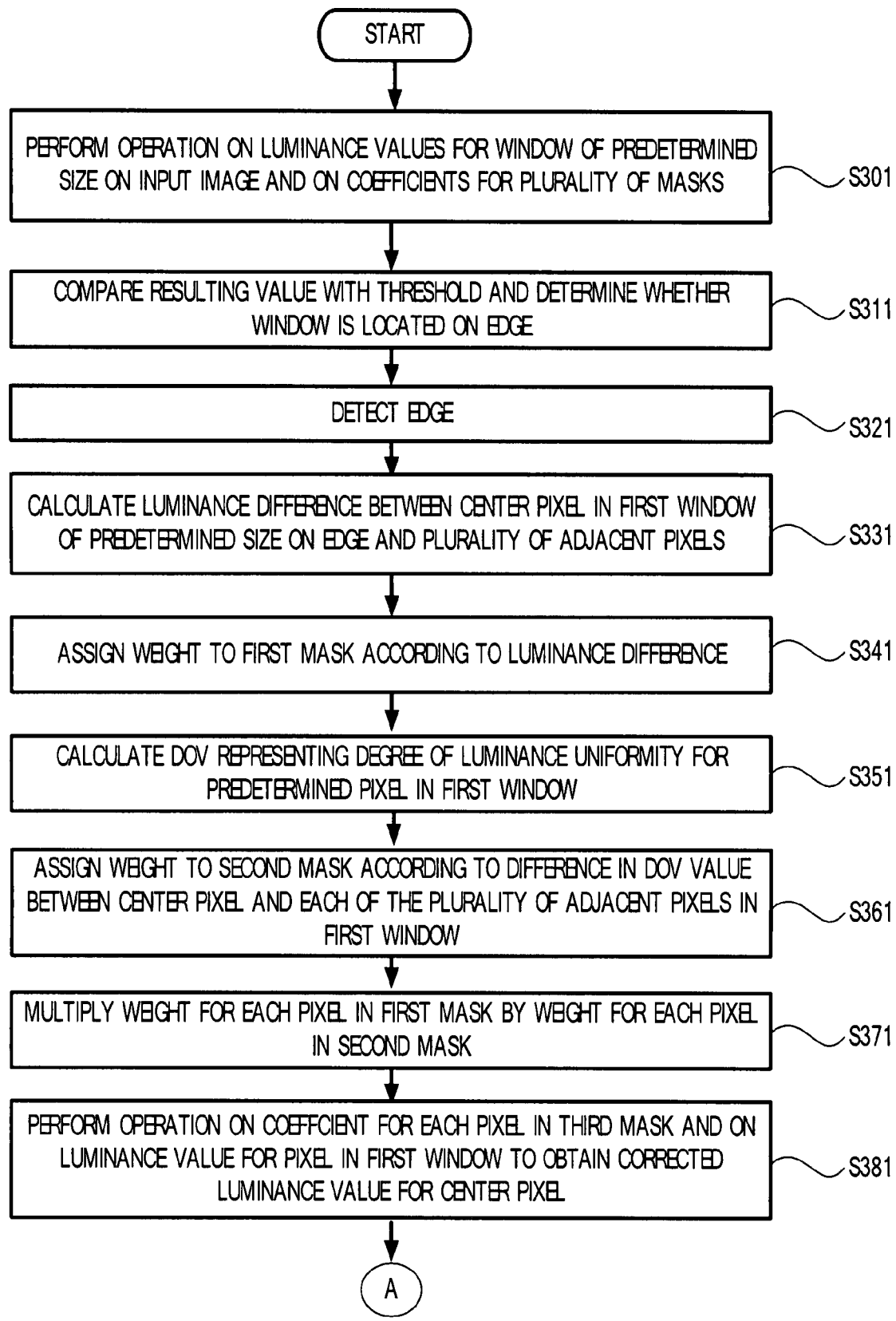
FIGS. 3 and 4 are a flowchart illustrating a method for correcting an edge employing the apparatus of FIG. 2 according to an embodiment of the present invention.
Figure 4:
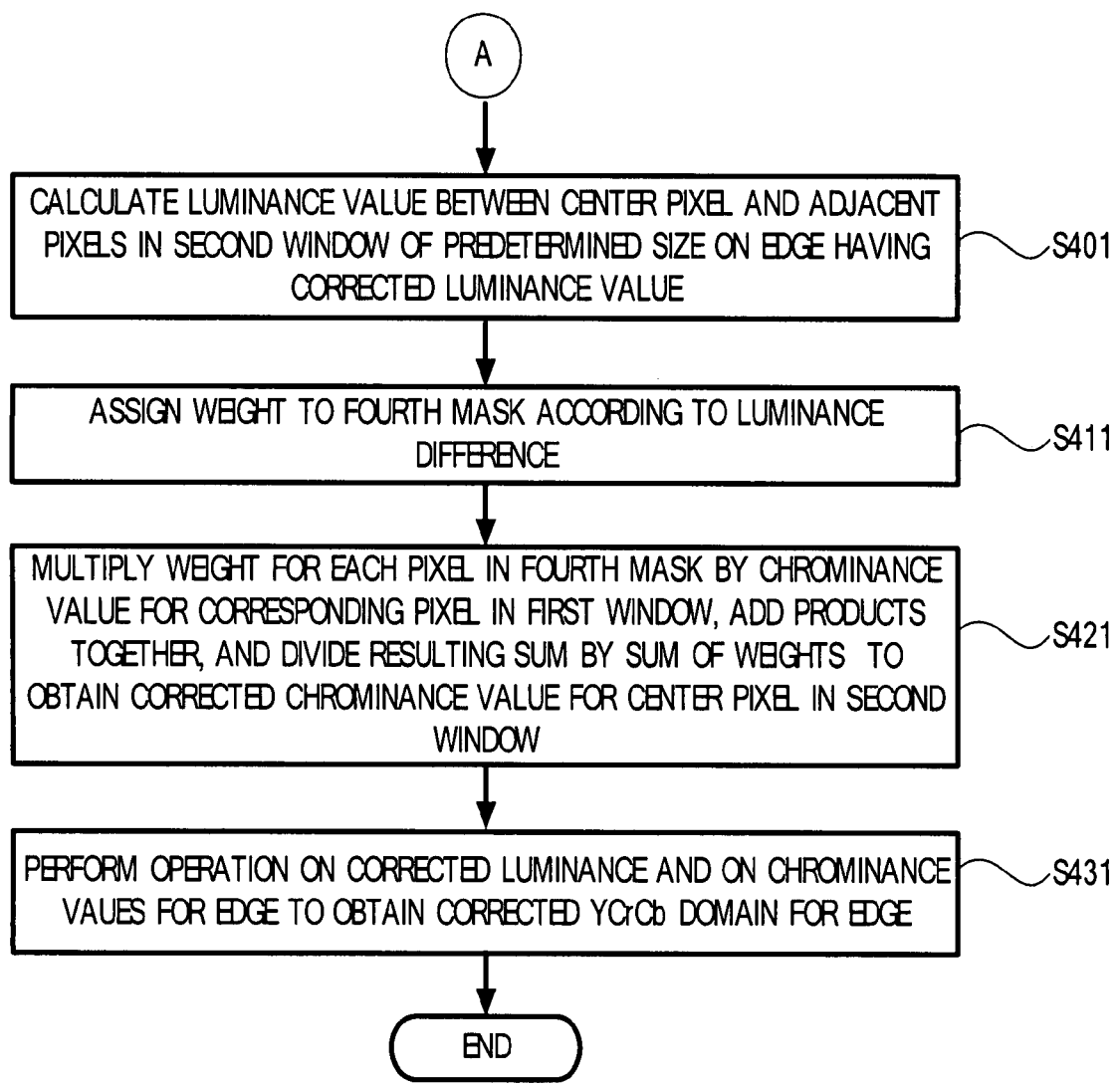

FIGS. 3-4 are a flowchart illustrating a method for correcting an edge employing the apparatus of FIG. 2 according to an embodiment of the present invention.

To avoid redundancy in description, the operations of the method for correcting an edge will now be described with reference to 3 and 4 except for that described above with respect to FIG. 2.

In operation S301, the edge operator 203 performs an operation on respective luminance values of pixels in a window having a predetermined size located on an input image and on respective pixel coefficients of a plurality of masks. In operation S311, the edge determiner 205 compares the value obtained by the edge operator 203 with a predetermined threshold to determine whether the window is located at an edge of the input image.

The edge detector 200 detects an edge according to a result of determination. The operations S301, S311, and S321 will be described more fully later with reference to FIG. 5A-5C.

In operation S331, the first luminance operator 223 calculates a difference between the luminance value of a center pixel in a first window having a predetermined size on the edge and the luminance value of each of the adjacent pixels. In operation S341, the first weight assigner 233 assigns a predetermined weight to a first mask 504 (FIG. 5B) according to the difference obtained by the first luminance operator 223. In this case, the first weight assigner 233 assigns a low weight to an adjacent pixel having an absolute value of a luminance difference from the center pixel greater than a predetermined threshold and a high weight to an adjacent pixel having an absolute value of a luminance difference from the center pixel less than the threshold so that the adjacent pixels can affect the correction of the luminance value of the center pixel in the first window to a different degree.

The operations S331 and S341 will be described in more detail later with reference to FIGS. 6A-7B.

In operation S351, the second luminance operator 226 computes a DoV representing the degree of uniformity of the luminance value of each pixel in the first window.

In operation S361, the second weight assigner 236 assigns a predetermined weight to a second mask 506 according to a difference between the DoV values of the center pixel and adjacent pixels in the first window. In this case, the second weight assigner 236 assigns a high weight to an adjacent pixel having a difference in the DoV value from the center pixel greater than a predetermined threshold and a low weight to an adjacent pixel having a difference in the DoV value from the center pixel less than the threshold. In this manner, the luminance value of the center pixel in the window can be made uniform like in the planar region.

In operation S371, the third luminance operator 229 multiplies a weight for each pixel in the first mask 504 by a weight for its corresponding pixel in the second mask 506 to obtain a coefficient for a corresponding pixel in a third mask 508.

In operation S381, the luminance corrector 210 performs an operation using pixel coefficients of the third mask obtained by the third luminance operator and luminance value for a pixel in the first window corresponding to each pixel in the third mask 508 to correct the luminance value for the edge.

The operations S351, S361, S371, and S381 will be described in more detail later with reference to FIGS. 8A-10B.

Referring to FIG. 4, in operation S401, the chrominance operator 243 calculates a difference between the luminance values of a center pixel and adjacent pixels to the center pixel in a second window having a predetermined size on the edge having the corrected luminance value.

In operation S411, the chrominance weight assigner 246 assigns a predetermined weight to a fourth mask 510 according to the difference in luminance value obtained by the chrominance operator 243. In this case, the chrominance weight assigner 246 assigns a low weight to an adjacent pixel in the second window, which is located within a predetermined range, so that the adjacent pixel can slightly affect correction of chrominance value of the center pixel in the second window.

In operation S421, the chrominance corrector 240 multiplies a weight for each pixel in the fourth mask 510 by a chrominance value for its corresponding pixel in the first window, adds the products together, and divides the resulting sum by the sum of the weights assigned to the fourth mask 510, thus obtaining the corrected chrominance value of the center pixel in the second window.

In operation S431, the combiner 250 performs an operation on the corrected luminance value and on the corrected chrominance value for the edge to obtain the corrected YCrCb domain for the edge.

The operations S401, S411, S421, and S431 will be described in more detail later with reference to FIGS. 11A-12B.

Figure 5A:
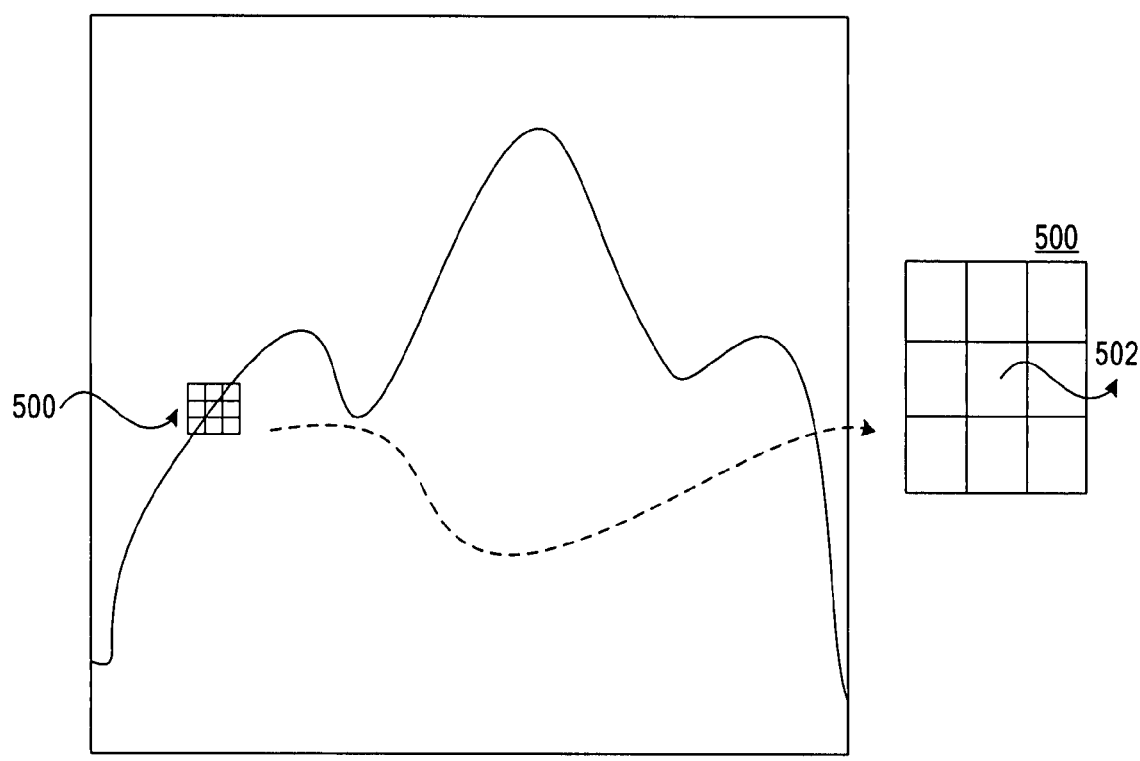
FIG. 5A-5C illustrate a process of detecting an edge according to an embodiment of the present invention.
Figures 5B, 5C:

FIGS. 5A-5C illustrate a process of detecting an edge according to an embodiment of the present invention.

Various conventional image processing may be used to detect an edge in an input image. However, a method for detecting a crucial edge in an input image according to an embodiment of the present invention includes moving a window of a predetermined size (n×n) over the input image and performing an operation on coefficients of pixels in a mask having the same size as the window and on luminance values Y for their corresponding pixels in the window. The window can sequentially move up/down or left/right over the input image to perform operations on coefficients of respective pixels in a predetermined mask.

For example, when a 3×3 window 500 is located at a predetermined portion of an input image as illustrated in FIG. 5A, the edge operator 203 may multiply a coefficient for each pixel in a 3×3 mask illustrated in FIG. 5B by the luminance value Y of its corresponding pixel in the window 500 to detect an edge in the input image.

That is, referring to FIG. 5C, the edge operator 203 multiplies a coefficient for each pixel in a first mask 504 by the luminance value Y of its corresponding pixel in the window 500 and adds the products together to obtain the resultant sum S1. In the same manner, the edge operator 203 can obtain the resultant values for second through fourth masks 506, 508, and 510. Thus, four values can be obtained for the four masks 504, 506, 508, and 510. In this case, the luminance value Y may be in a range of between 0 and 255.

When the resultant values for the first through fourth masks 504, 506, 508, and 510 are S1 through S4, the edge operator 203 extracts a difference between a maximum value MAX and a minimum value MIN of the resultant values S1 through S4. For example, when the maximum value MAX and the minimum value MIN are S4 and S1, respectively, the edge operator 203 calculates a difference between S4 and S1 and compares an absolute value of the difference with a predetermined threshold. When the absolute-value difference is greater than the threshold, the edge determiner 205 determines that an image of a center pixel 502 in the window 500 is located at the edge in the input image. Conversely, when the absolute-value difference is less than the threshold, the edge determiner 205 determines that the image of the center pixel 502 is on a planar region of the input image. In this manner, the edge detector 200 can detect an edge of the input image. A process of clearing the luminance of the detected edge will be described below with reference to FIGS. 6A-10B.

FIGS. 6A-7B illustrate a process of assigning a weight to a first mask according to a luminance difference between a center pixel in a window and its adjacent pixels according to an embodiment of the present invention.

The luminance corrector 210 outputs the edge of the input image detected using the process illustrated in FIGS. 5A-5C as a corrected luminance value. Although in the present embodiment, a luminance value for the edge is corrected using a 5×5 window 600 and a 3×3 sub-window 800, the size of the window 600 or sub-window 800 may vary.

Figure 6A:
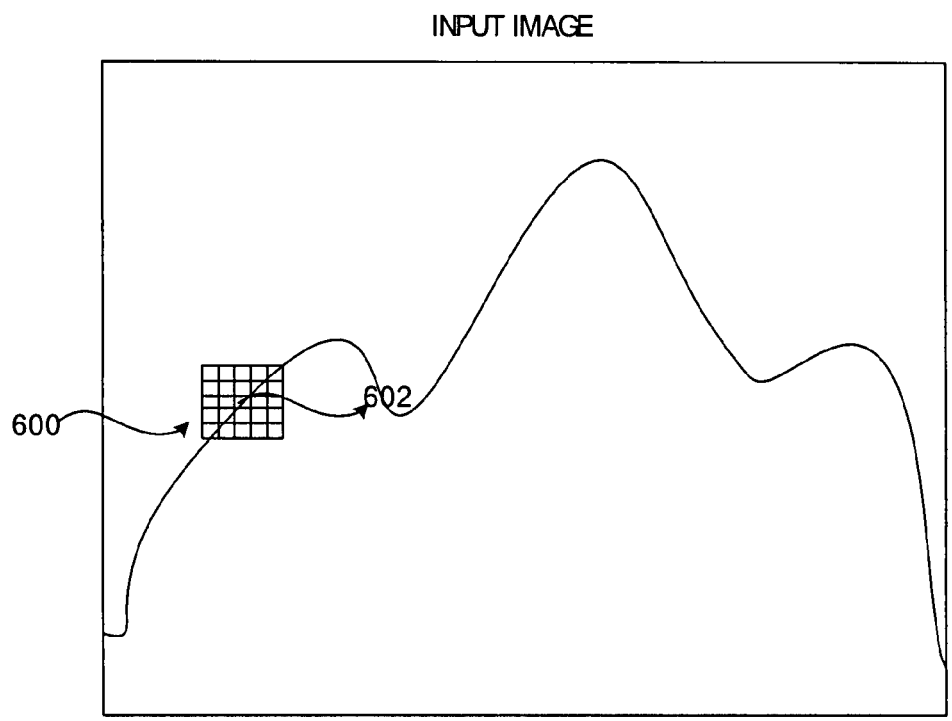
Figure 6B:
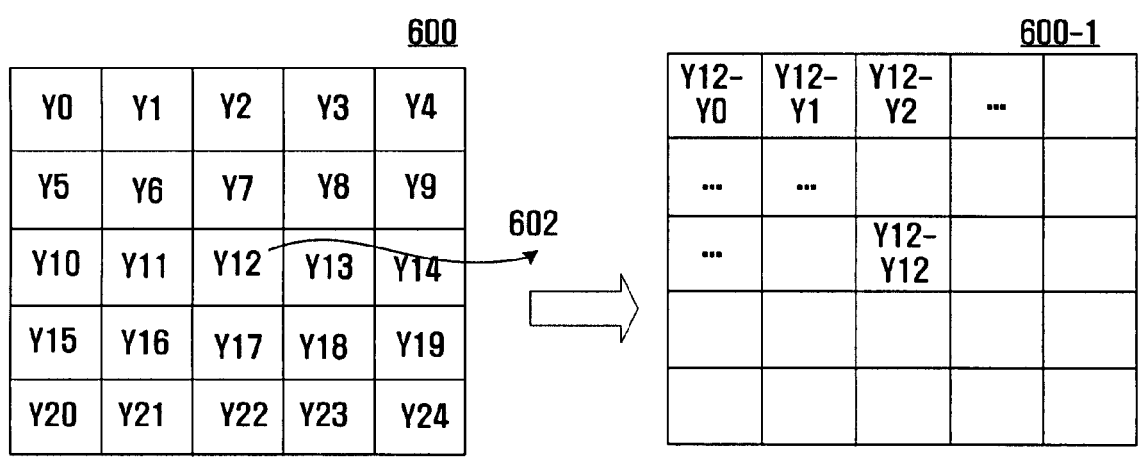

Referring to FIGS. 6A and 6B, the first luminance operator 223 moves a center pixel 602 in the 5×5 window (first window) 600 to an edge and performs an operation on luminance values of the center pixel 602 and on its adjacent pixels in the window 600. More specifically, the first luminance operator 223 computes a difference I between luminance values of the center pixel 602 and each of adjacent pixels to the center pixel 602. For example, when the luminance values of the center pixel 602 and a first pixel in the window 600 are Y12 and Y0, respectively, the first luminance operator 223 subtracts Y0 from Y12. Similarly, the first luminance operator 223 performs operations on all the remained adjacent pixels.

Figures 7A, 7B:
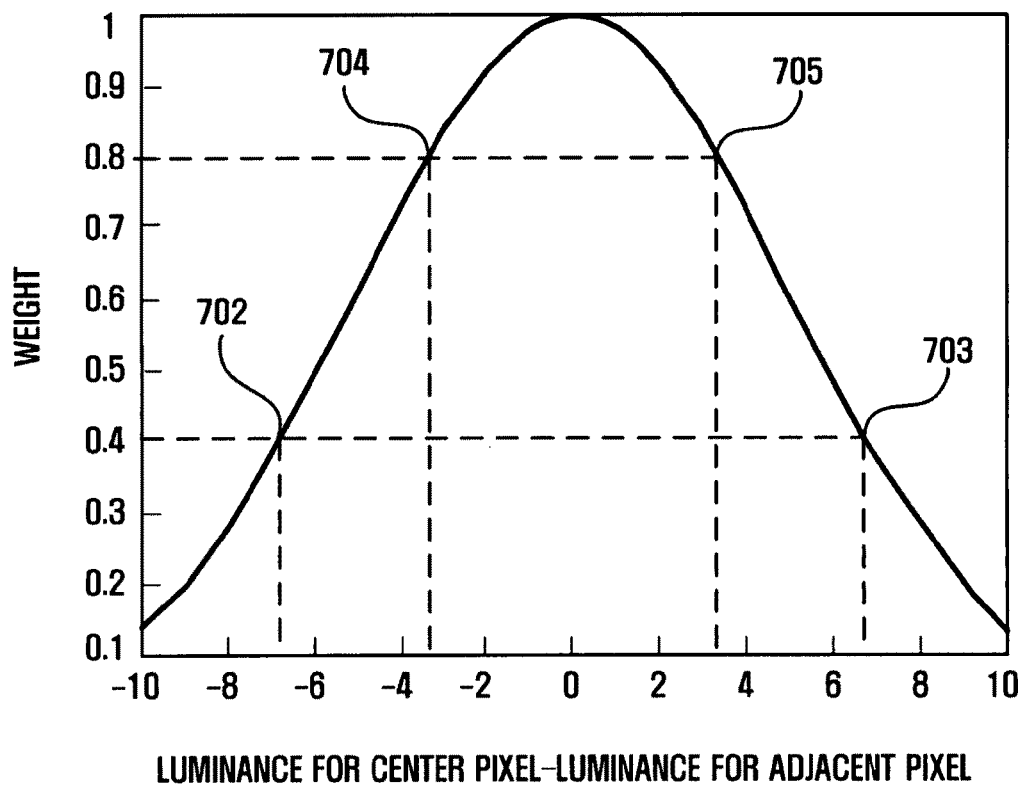

FIG. 7A is a graph of a weight (Y-axis) against a luminance difference I (X-axis) between the center pixel 602 and each of a plurality of adjacent pixels to the center pixel 602. FIG. 7B illustrates a first mask 700 having coefficients that are the assigned weights. As evident from FIG. 7A, the first weight assigner 233 assigns a low weight to an adjacent pixel having a large luminance difference from the center pixel 602 (See 702 and 703) and a high weight to an adjacent pixel having a small luminance difference from the center pixel 602 (See 704 and 705). In this manner, an adjacent pixel with a luminance value closer to that of the center pixel 602 can more largely affect correction of luminance value of the center pixel 602.

FIGS. 8A-9B illustrate a process of assigning a weight to a second mask according to a difference in the DoV value between a center pixel 602 in a window 600 and each of its adjacent pixels according to an embodiment of the present invention.

The luminance operator 220 computes a DoV value of each pixel in the window. The DoV value represents the degree of uniformity in luminance values of pixels. The luminance weight assigner 230 assigns a weight to the luminance value of each pixel in the window according to a difference in the DoV value between the center pixel 602 and each of its adjacent pixels so that the luminance value of the center pixel 602 can be made uniform like in the planar region. The above process is described in more detail as follows.

First, the second luminance operator 226 moves a center pixel 802 in a 3×3 sub-window 800 having a predetermined size so that it corresponds to a predetermined pixel in the window located on an edge of an input image and performs an operation on the luminance values of the center pixel 802 and on adjacent pixels in the sub-window 800.

Figure 8A:
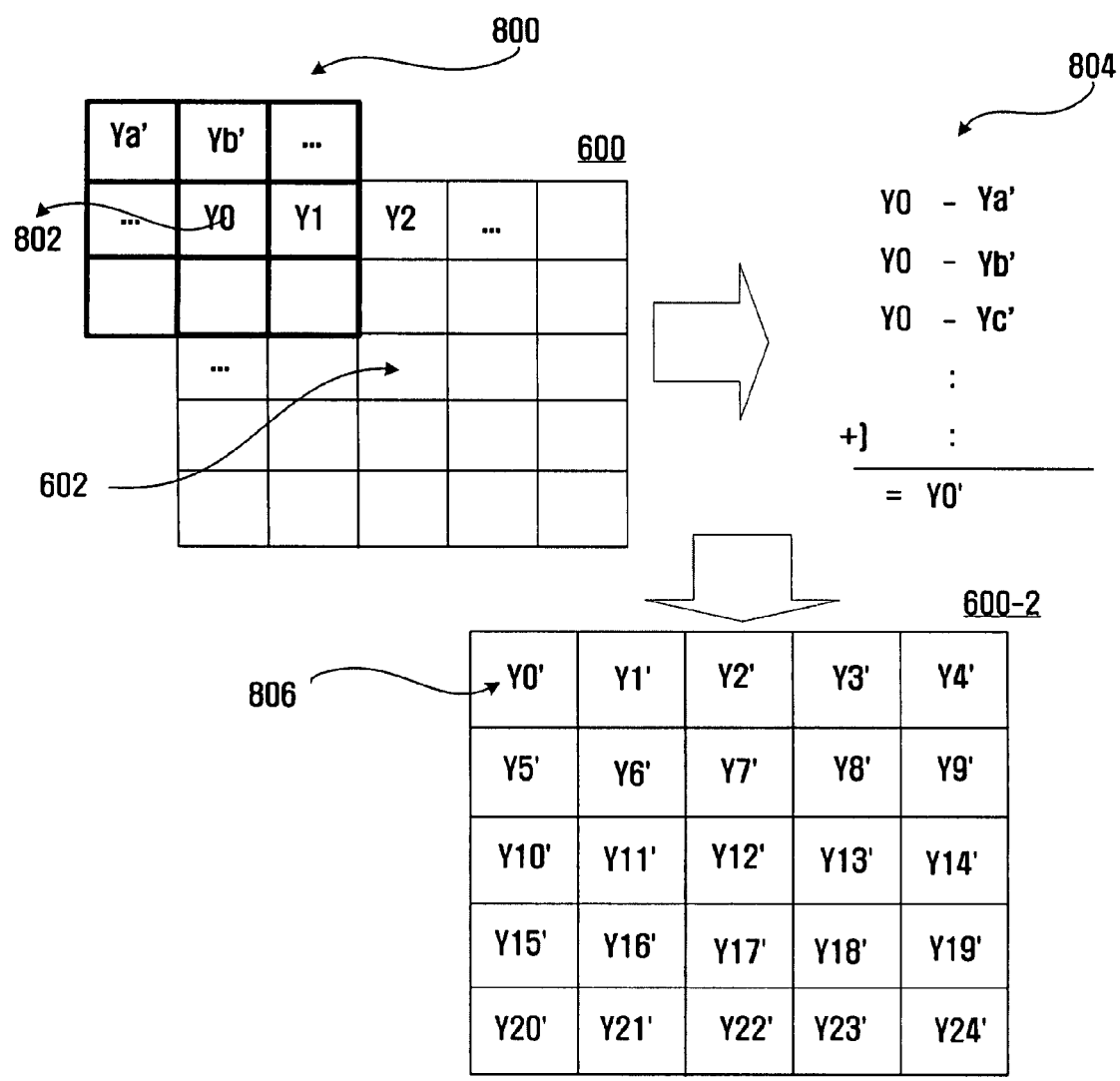

For example, referring to FIG. 8A, the second luminance operator 226 moves the center pixel 802 in the sub-window 800 so that it corresponds to a first pixel in the window located at the edge of the input image, calculates a difference between the luminance value Y0 of the center pixel 802 in the sub-window 800 and the luminance value of each of its adjacent pixels in the sub-window 800, and adds the differences together (See 804) to obtain the resultant value for the first pixel in the window 600-2 (See 806). In the same manner, the second luminance operator 226 performs operations on all the remained pixels in the window 600. The resultant values obtained by the second luminance operator 226 are a difference of variation (DoV) value indicating the degree of uniformity of the luminance value of each pixel in the window 600-2. A low DoV value means that a pixel in the window is located at a planar region of uniform luminance. A high DoV value means that a pixel in the window 600-2 is located at a non-planar region of non-uniform luminance.

Figure 8B:
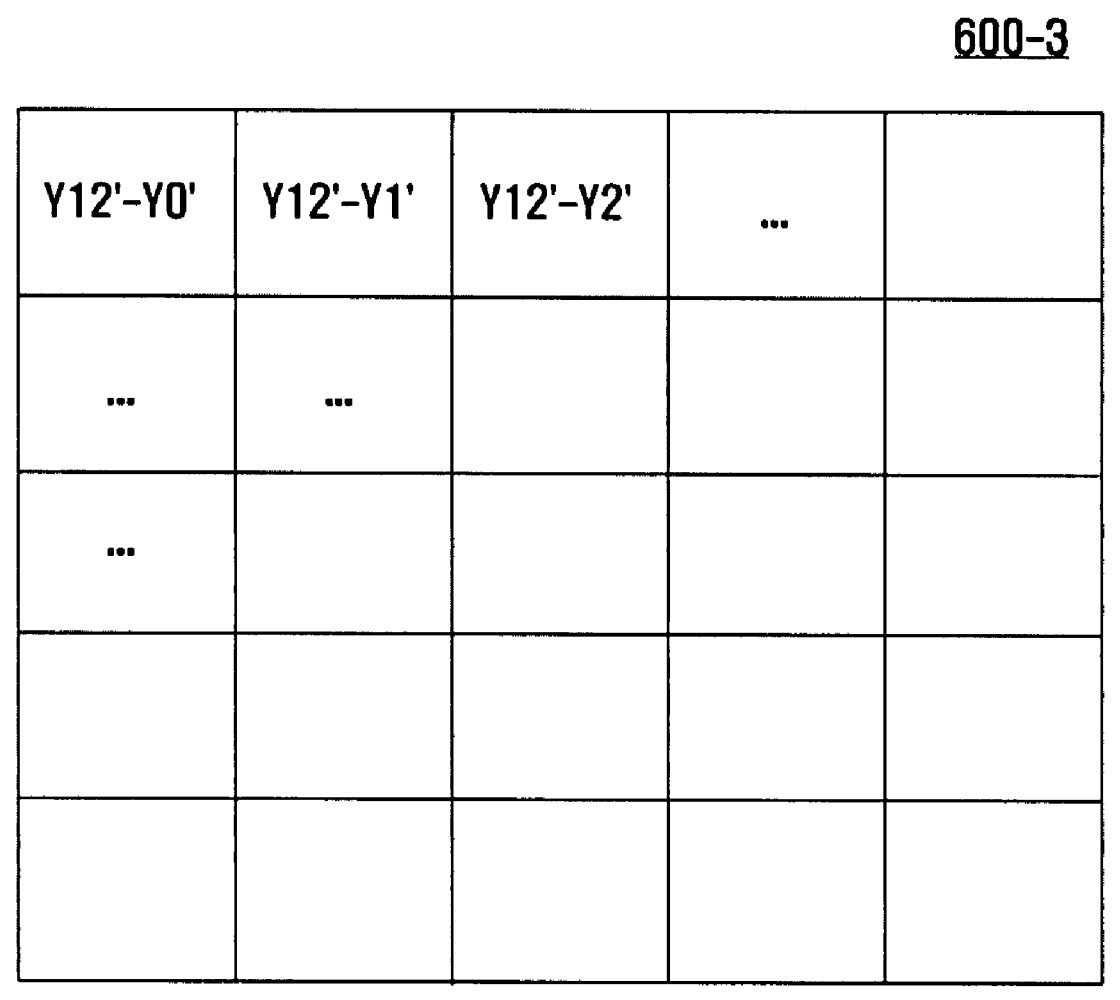

Referring to FIG. 8B, the second luminance operator 226 then calculates a difference II between the DoV value of the center pixel 602 in the window 600 and the DoV value of each of its adjacent pixels. For example, when the DoV values of the center pixel 602 and the first pixel in the window 600 are Y12' and Y0', respectively, the second luminance operator 226 subtracts Y0' from Y12'. Similarly, the second luminance operator 226 performs operations on all the remained adjacent pixels. Window 600-3 shows the resultant of calculation Referring to FIGS. 9A and 9B, the second weight assigner 236 assigns a weight (Y-axis) to a pixel in a second mask 900 corresponding to each pixel in the window 600 according to the difference in the DoV value II (X-axis) between the center pixel 602 and each of its adjacent pixels. The second weight assigner 236 assigns a high weight to an adjacent pixel having a large difference in the DoV value from the center pixel 602 (See 904) and a low weight to an adjacent pixel having a small difference in the DoV value from the center pixel 602 (See 902). An adjacent pixel having a large difference in the DoV value from the center pixel 602 represents a planar region having more uniform luminance than the center pixel 602. An adjacent pixel having a small difference in the DoV value from the center pixel 602 represents a planar region having more non-uniform luminance than the center pixel 602.

Thus, the second weight assigner 236 assigns a high weight to an adjacent pixel at a planar region having more uniform luminance than the center pixel 602 so that the adjacent pixel can largely affect correction of the luminance value of the center pixel 602. Conversely, the second weight assigner 236 assigns a low weight to an adjacent pixel at a non-planar region having more non-uniform luminance than the center pixel 602 so that the adjacent pixel can slightly affect correction of the luminance value of the center pixel 602. In this manner, the luminance value of the center pixel 602 can be made uniform like in the planar region.

Figure 10A:
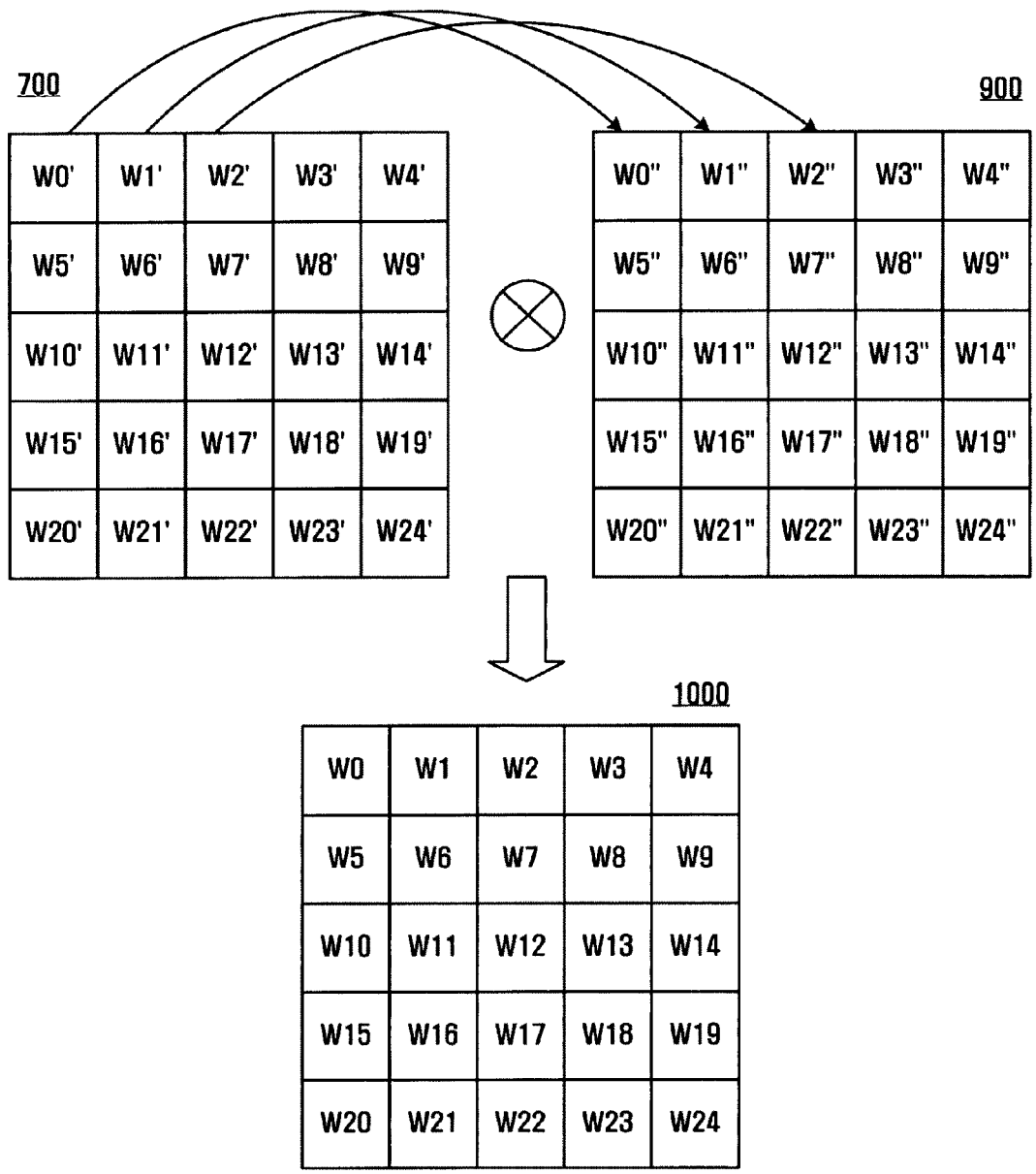
FIGS. 10A and 10B illustrates a process of correcting a luminance value for an edge using values obtained by performing operations on first and second masks according to an embodiment of the present invention.
Figure 10B:

FIGS. 10A and 10B illustrate a process of correcting a luminance value for an edge using values obtained by performing operations on first and second masks 700 and 900 according to an embodiment of the present invention.

Referring to FIG. 10A, the third luminance operator 229 performs an operation on a weight assigned to each pixel in the first mask 700 according to the luminance difference I and on a weight assigned to its corresponding pixel in the second mask 900 according to the difference in the DoV value (II) to obtain a coefficient for each pixel in a third mask 1000. For example, when a weight for a first pixel in the first mask is W0' and a weight for a first pixel in the second mask 900 is W0", the third luminance operator 229 multiplies the weight W0' by the weight W0" to obtain the product W0 as a coefficient for a first pixel in the third mask 1000. The third luminance operator 229 performs an operation on the remained pixels in the same manner.

Referring to FIG. 10B, the luminance corrector 210 multiplies the coefficients of pixels in the third mask 1000, i.e., weights Wn, by luminance values Yn for respective pixels in the window 600, which respectively correspond to the pixels in the third mask 1000, adds the products together $$\left(\sum_{n=0}^{24}(Wn \times Yn)\right),$$

and divides the resultant sum by the sum of the weights of the third mask 1000

$$\left(\sum_{n=0}^{24} Wn\right),$$

thus obtaining the corrected luminance value Y' for the center pixel 602 in the window 600. The corrected luminance value Y' is defined by the following Equation:

$$\text{Corrected luminance value of center pixel } (Y') = \frac{\sum_{n=0}^{24}(Wn \times Yn)}{\sum_{n=0}^{n=24} Wn}$$

In this manner, the luminance corrector 210 corrects a luminance value for an edge, thus increasing the sharpness of an image.

FIGS. 11A-12B illustrate a process of correcting a chrominance value for an edge based on corrected luminance value for the edge according to an embodiment of the present invention. Although in the present embodiment, a chrominance value Cr for the edge is corrected, chrominance values Cr and Cb may be corrected simultaneously.

Figure 11A:
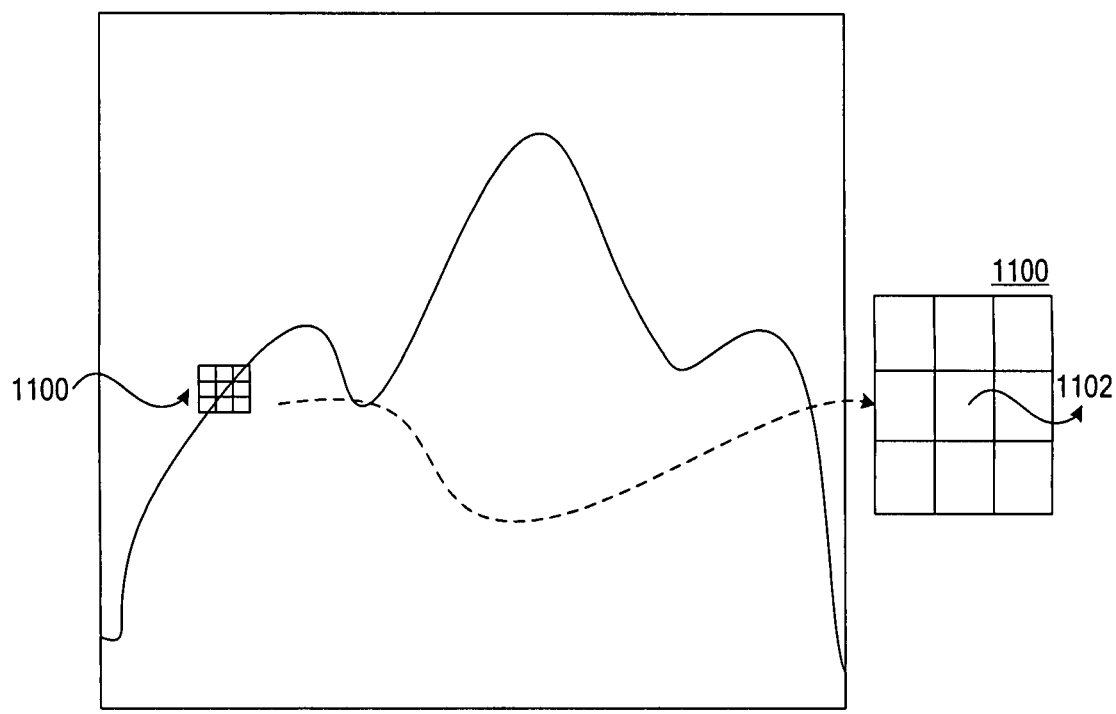
FIGS. 11A-12B illustrate a process of correcting a chrominance value for an edge based on a corrected luminance value for the edge according to an embodiment of the present invention.

Referring to FIG. 11A, the chrominance corrector 243 moves a center pixel 1102 in a 3×3 window 1100 (second window) to the edge with the luminance value Y' corrected using the processes illustrated in FIGS. 6A-10B. Although in the present embodiment, a chrominance value for the edge is corrected using the 3×3 window 1100, the size of the window 1100 may vary.

Figure 11B:
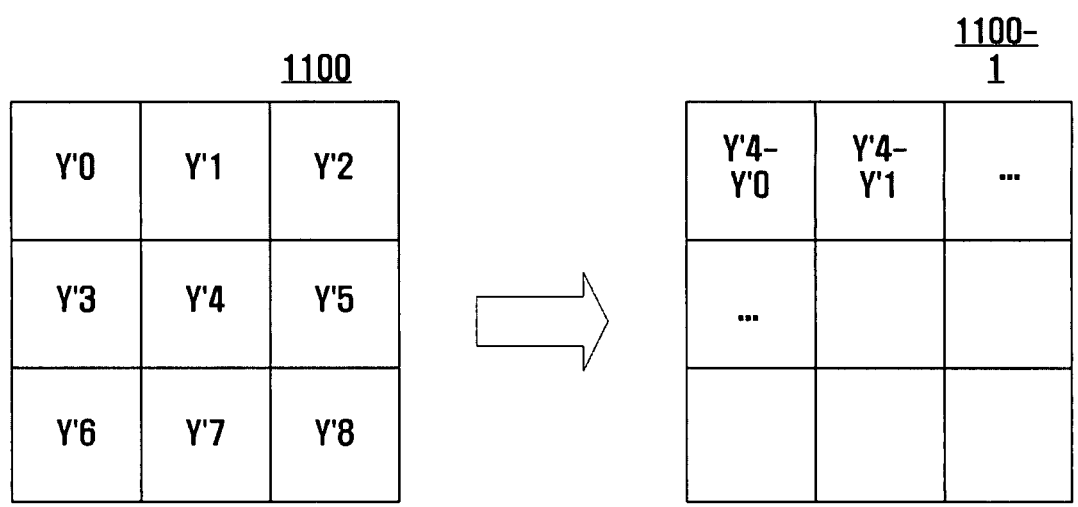

The chrominance operator 243 computes a difference III between the luminance values of the center pixel 1102 and adjacent pixels to the center pixel 1102 in the window 1100. Referring to FIG. 11B, the chrominance operator 243 computes an absolute value of the difference III between the luminance values of the center pixel 1102 and each of its adjacent pixels. A window 1100-1 shows a computizing result of the chrominance operator 243.

Figure 12A:
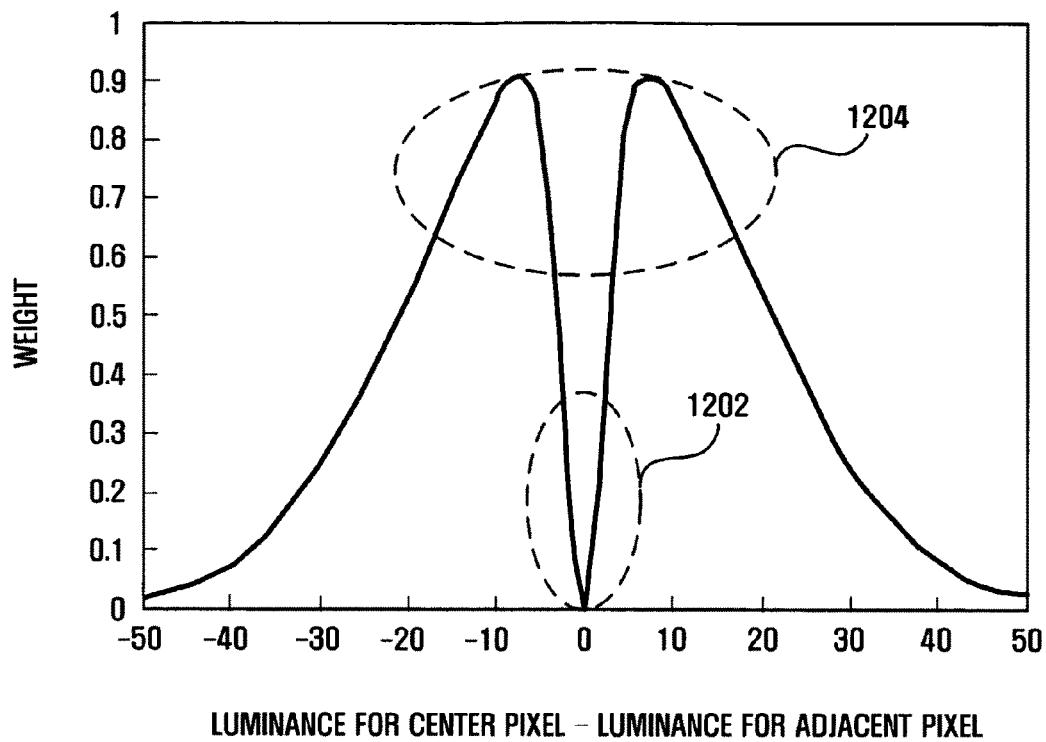

Referring to FIG. 12A, the chrominance weight assigner 246 assigns a weight (Y-axis) to a pixel in a fourth mask 1200 corresponding to each pixel in the window 1100 according to an absolute value of the difference III (X-axis). In this case, the chrominance weight assigner 246 assigns a low or zero weight to an adjacent pixel at almost the same position as the center pixel 1102 (See 1202) so that the adjacent pixel can slightly affect correction of chrominance value of the center pixel 1102, thus minimizing internal color fringe error. On the other hand, the chrominance weight assigner 246 assigns a high weight to an adjacent pixel having a luminance difference from the center pixel within a predetermined range (See 1204) so that the adjacent pixel can largely affect correction of chrominance value of the center pixel 1102, thus increasing the sharpness of the edge.

The chrominance corrector 240 performs an operation on chrominance values for each pixel in the fourth mask 1200 and on its corresponding pixel in the window 1100.

Figure 12B:

For example, referring to FIG. 12B, the luminance corrector 210 multiplies a weight W'n for each pixel in the fourth mask 1200 by a chrominance value Crn for each pixel in the window 1100-2 corresponding to each pixel in the fourth mask 1200, adds the products together $$\left( \sum_{n=0}^{8} (W'n \times Crn) \right),$$

and divides the resulting sum by the sum of the weights $$\left( \sum_{n=0}^{8} (W'n) \right)$$

of the fourth mask 1200, thus obtaining the corrected luminance value Cr' for the center pixel 1102 in the window 1100-2. The corrected luminance value Cr' is defined by the following Equation:

$$\text{Corrected chrominance value of the center pixel } (Cr') = \frac{\sum_{n=0}^{8} (W'n \times Crn)}{\sum_{n=0}^{8} (W'n)}$$

In this manner, the chrominance corrector 240 corrects a chrominance value for an edge. Thus, a vivid (clear and clean) image can be obtained by reducing color fringe defects that are observable in a high frequency region.

As described above, thereafter, the combiner 250 performs an operation on the corrected luminance value and on the corrected chrominance value for the edge to obtain the entire corrected YCrCb domain for the edge. The combiner 250 may further enhance the edge by adding undershoot and overshoot to low- and high-luminance areas, respectively. The combiner 250 also converts the YCrCb domain to a RGB domain using conventionally known techniques and outputs the RGB domain image.

Figure 13A:
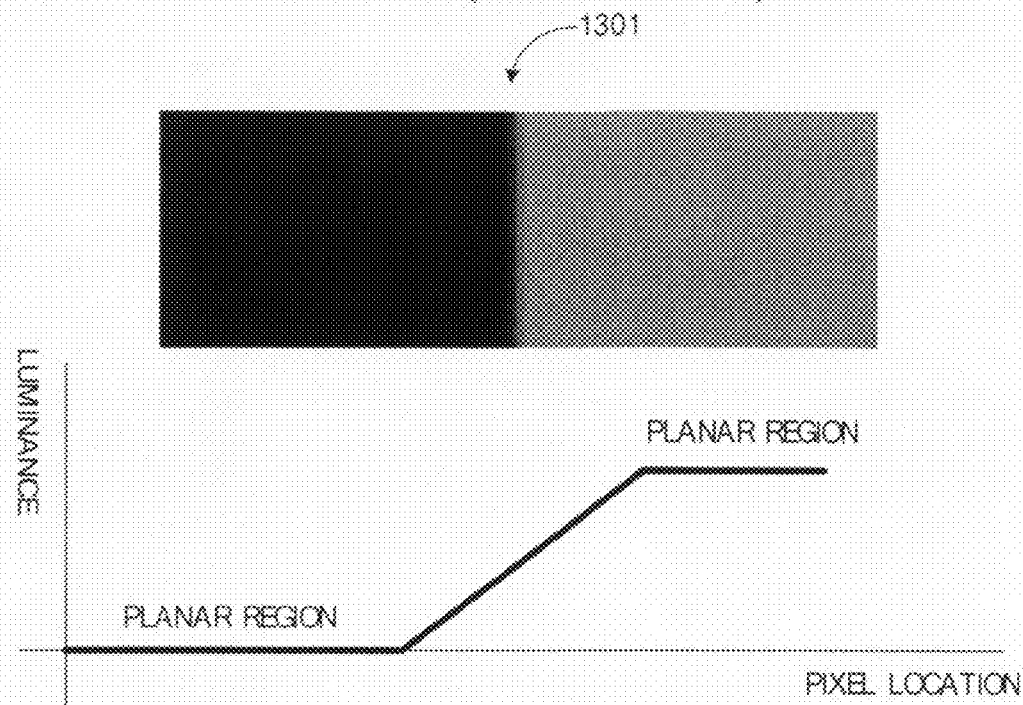
FIG. 13A-13C illustrates a variation in luminance gradient according to an embodiment of the present invention.
Figure 13B:
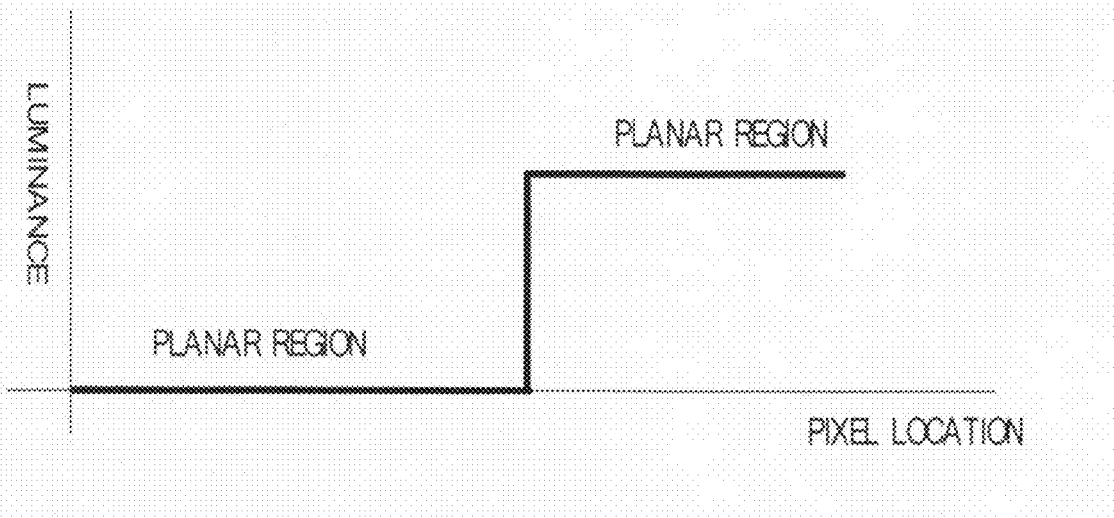
Figure 13C:
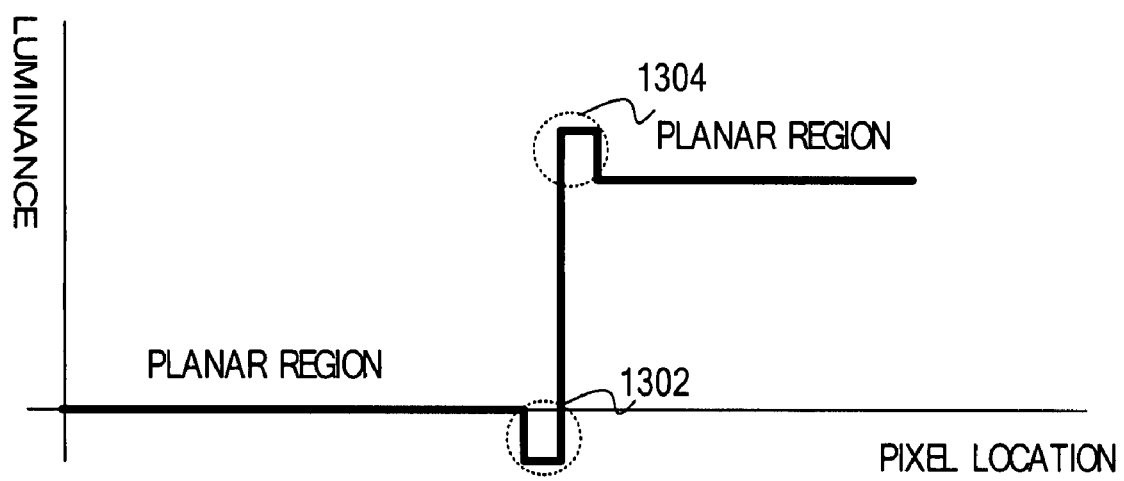

FIG. 13A-13C illustrates a variation in luminance gradient according to an embodiment of the present invention. Y and X axises represents a luminance value for each pixel and pixels in a horizontal line across the input image, respectively.

FIG. 13A illustrates a variation in luminance gradient when a conventional edge correction method is used. Referring to FIG. 13A, a planar region is a region having uniform variation in luminance and a luminance gradient is gradually changed according to the degree of blurring around an edge 1301.

FIG. 13B illustrates a variation in luminance gradient when an edge correction method according to an aspect of the present invention. Referring to FIG. 13B, the edge correction apparatus 100 applies luminance and chrominance correction to the edge 1301 so that a luminance gradient is changed rapidly, thus improving the sharpness of the edge 1301 while minimizing image noise that may occur when sharpness of the edge 1301 enhanced.

FIG. 13C illustrates a variation in luminance gradient when an edge correction method according to the present invention is used in combination with conventionally known techniques. Referring to FIG. 13C, the edge correction apparatus 100 uses conventionally known techniques in addition to the edge correction method of the present invention to further enhance the edge 1301 by adding undershoot and overshoot to low- and high-luminance areas 1302 and 1304, respectively.

An apparatus and method for correcting an edge according to the present invention can reduce defects that may occur when the sharpness of an image at an edge is enhanced and correct the edge of the image more effectively, thus providing a more vivid image.

While the present invention has been particularly shown and described with reference to exemplary embodiments thereof, it will be understood by those of ordinary skill in the art that various changes in form and details may be made therein without departing from the spirit and scope of the present invention as defined by the following claims and their equivalents. It is therefore desired that the present embodiments be considered in all respects as illustrative and not restrictive, reference being made to the appended claims rather than the foregoing description to indicate the scope of the invention.

What is claimed is:

1. An apparatus for correcting an edge of input image, comprising:
a luminance corrector to obtain a corrected luminance value of a center pixel in a first window of a predetermined size, the first window located at the edge of the input image, by using weights assigned according to a luminance difference between the center pixel and each of a plurality of adjacent pixels in the first window or a predetermined difference of variance (DoV) value representing the degree of uniformity in the luminance between the center pixel and each of the plurality of adjacent pixels; and
a chrominance corrector to correct a chrominance value of the edge using weights assigned according to a luminance difference between a center pixel and a plurality of adjacent pixels to the center pixel in a second window of a predetermined size based on the corrected luminance value,
wherein the adjacent pixels are in the first or the second window other than the center.

2. The apparatus of claim 1, wherein the luminance corrector comprises a first luminance operator to calculate a luminance difference between the center pixel and its adjacent pixels in the first window and a first weight assigner assigning a predetermined weight to a first mask according to the luminance difference, and
wherein the first weight assigner assigns a low weight to an adjacent pixel having an absolute value of a luminance difference from the center pixel in the first window, which is greater than a predetermined threshold, and a high weight to an adjacent pixel having an absolute value of a luminance difference from the center pixel, which is less than the threshold, so that the adjacent pixels can affect the correction of a luminance value of the center pixel in the first window to a different degree.

3. The apparatus of claim 2, wherein the luminance corrector further comprises:
a second luminance operator to calculate the DoV value representing the degree of uniformity in luminance values of pixels in the first window; and
a second weight assigner to assign a predetermined weight to a second mask according to a difference in the DoV between the center pixel and each of the plurality of adjacent pixels in the first window, and
wherein the second weight assigner assigns a high weight to an adjacent pixel in the first window having a difference in the DoV value from the center pixel greater than a predetermined threshold and a low weight to an adjacent pixel in the first window having a difference in the DoV value from the center pixel less than the threshold so that a luminance value of the center pixel in the first window can be made uniform like in a planar region.

4. The apparatus of claim 3, wherein the second luminance operator moves a center pixel in a sub-window having a predetermined size so that it corresponds to a predetermined pixel in the first window, calculates a luminance difference between the center pixel and each of a plurality of its adjacent pixels in the sub-window, and adds together the differences to obtain the DoV value for the predetermined pixel in the first window.

5. The apparatus of claim 3, wherein the luminance corrector further comprises a third luminance operator to multiply a weight for each pixel in the first mask by a weight for its corresponding pixel in the second mask and to perform an operation on the resulting value that is a coefficient for each pixel in a third mask and on a luminance value for a pixel in the window corresponding to each pixel in the third mask to obtain a corrected luminance value for the center pixel in the first window.

6. The apparatus of claim 5, wherein the luminance corrector multiplies a coefficient for each pixel in the third mask by a luminance value for its corresponding pixel in the first window, adds the products together, and to divide the resultant sum by the sum of the coefficients for the third mask, thus obtaining the corrected luminance value for the center pixel in the first window.

7. The apparatus of claim 1, wherein the chrominance corrector comprises a chrominance operator to calculate a luminance difference between the center pixel and each of the plurality of adjacent pixels in the second window and a chrominance weight assigner to assign a predetermined weight to a fourth mask according to the luminance difference, and
wherein the chrominance weight assigner assigns a low weight to an adjacent pixel in the second window, which is located within a predetermined range, so that the adjacent pixel can slightly affect correction of chrominance value of the center pixel in the second window.

8. The apparatus of claim 7, wherein the chrominance corrector multiplies a weight for each pixel in the fourth mask by a chrominance value for its corresponding pixel in the first window, adds the products together, and divides the resulting sum by the sum of the weights assigned to the fourth mask, thus obtaining the corrected chrominance value of the center pixel in the second window.

9. The apparatus of claim 1, further comprising an edge detector to detect the edge of the input image.

10. The apparatus of claim 9, wherein the edge detector comprises:
an edge operator to perform an operation on a luminance value for each pixel in a window having a predetermined size on the input image and on a coefficient for its corresponding pixel in each of a plurality of masks; and
an edge determiner to compare the value obtained by the edge operator with a predetermined threshold and to determine whether the window is located at the edge.

11. The apparatus of claim 10, wherein the edge operator multiplies a coefficient for each pixel in each of a plurality of masks by a luminance value for its corresponding pixel in the window, adds the products together, and calculates a difference between maximum and minimum values of a plurality of sums and determines the absolute value of the difference, thus obtaining the resulting value.

12. The apparatus of claim 1, further comprising a combiner to perform an operation on the corrected luminance value and on the corrected chrominance value for the edge and to obtain the corrected YCrCb domain for the edge.

13. The apparatus of claim 12, wherein the combiner to enhance the edge by adding undershoot low-luminance area and/or overshoot to high-luminance area.

14. An apparatus for correcting an edge of input image, comprising:
an edge detector detecting an edge; and
a luminance corrector to obtain a corrected luminance value of a center
pixel in a first window of a predetermined size, the first window located at the edge of the input image, by using weights assigned according to a luminance difference between the center pixel and each of a plurality of adjacent pixels in the first window or a predetermined difference of variance (DoV) value representing the degree of uniformity in the luminance between the center pixel and each of the plurality of adjacent pixel,
wherein,
the adjacent pixels are pixels in the first window other than the center pixel,
the luminance corrector comprises a first luminance operator to calculate a luminance difference between the center pixel and its adjacent pixels in the first window and a first weight assigner assigning a predetermined weight to a first mask according to the luminance difference, and
the first weight assigner assigns a low weight to an adjacent pixel having an absolute value of a luminance difference from the center pixel in the first window, which is greater than a predetermined threshold, and a high weight to an adjacent pixel having an absolute value of a luminance difference from the center pixel, which is less than the threshold, so that the adjacent pixels can affect the correction of a luminance value of the center pixel in the first window to a different degree.

15. The apparatus of claim 14, wherein the edge detector comprises:
an edge operator to perform an operation on a luminance value for each pixel in a window having a predetermined size on the input image and on a coefficient for its corresponding pixel in each of a plurality of masks; and
an edge determiner to compare the value obtained by the edge operator with a predetermined threshold and determining whether the window is located at the edge.

16. A method for correcting an edge in an input image, comprising:
obtaining a corrected luminance value of a center pixel in a first window of a predetermined size on the edge of the input image by using weights assigned according to a luminance difference between the center pixel and a plurality of adjacent pixels to the center pixel or a difference in a predetermined value representing the degree of luminance uniformity between the center pixel and the plurality of adjacent pixels; and
correcting a chrominance value of the edge using weights assigned according to a luminance difference between a center pixel and a plurality of adjacent pixels to the center pixel in a second window of a predetermined size on the edge having the corrected luminance value,
wherein the adjacent pixels are pixels in the first or the second window other than the center pixel.

17. The method of claim 16, wherein the obtaining of the corrected luminance value of the center pixel in the first window comprises calculating a luminance difference between the center pixel and the plurality of its adjacent pixels in the first window and assigning a predetermined weight to a first mask according to the luminance difference, and wherein in the assigning of the predetermined weight to the first mask, a low weight is assigned to an adjacent pixel having an absolute value of a luminance difference from the center pixel in the first window, which is greater than a predetermined threshold, and a high weight is assigned to an adjacent pixel having an absolute value of a luminance difference from the center pixel, which is less than the threshold, so that the adjacent pixels can affect the correction of a luminance value of the center pixel in the first window to a different degree.

18. The method of claim 17, wherein the obtaining of the corrected luminance value of the center pixel in the first window further comprises calculating the DoV (Difference of Variation) value representing the degree of uniformity in the luminance of respective pixels in the first window and assigning a predetermined weight to the second mask according to a difference in the DoV value between the center pixel and each of the plurality of adjacent pixels in the first window, and wherein in the assigning of the predetermined weight to the second mask, a high weight is assigned to an adjacent pixel in the first window having a difference in the DoV value between the center pixel greater than a predetermined threshold and a low weight is assigned to an adjacent pixel in the first window having the difference in the DoV value from the center pixel less than the threshold so that a luminance value of the center pixel in the first window can be made uniform like in a planar region.

19. The method of claim 18, wherein the calculating of the DoV value comprises moving a center pixel in a sub-window having a predetermined size so that it corresponds to a predetermined pixel in the first window, calculating a luminance difference between the center pixel and each of a plurality of its adjacent pixels in the sub-window, and adding together the differences to obtain the DoV value for the predetermined pixel in the first window.

20. The method of claim 18, wherein the obtaining of the corrected luminance value of the center pixel in the first window further comprises multiplying a weight for each pixel in the first mask by a weight for its corresponding pixel in the second mask and performing an operation on the resulting value that is a coefficient for each pixel in the third mask and on a luminance value for a pixel in the window corresponding to each pixel in the third mask to obtain the corrected luminance value for the center pixel in the first window.

21. The method of claim 20, wherein the obtaining of the corrected luminance value of the center pixel in the first window further comprises multiplying a coefficient for each pixel in the third mask by a luminance value for its corresponding pixel in the first window, adding the products together, and dividing the resulting sum by the sum of the coefficients for the third mask.

22. The method of claim 16, wherein the correcting of the chrominance value of the edge comprises calculating a luminance difference between the center pixel and the plurality of adjacent pixels in the second window and assigning a predetermined weight to a fourth mask according to the luminance difference, and wherein in the assigning of the predetermined weight to the fourth mask, a low weight is assigned to an adjacent pixel in the second window which is located within a predetermined range so that the adjacent pixel can slightly affect correction of chrominance value of the center pixel in the second window.

23. The method of claim 22, wherein the correcting of the chrominance value of the edge further comprises multiplying a weight for each pixel in the fourth mask by a chrominance value for its corresponding pixel in the first window, adding the products together, dividing the resulting sum by the sum of the weights assigned to the fourth mask, and obtaining the corrected chrominance value of the center pixel in the second window.

24. The method of claim 16, further comprising detecting the edge, wherein the detecting of the edge comprises:
performing an operation on a luminance value for each pixel in a window having a predetermined size on the input image and on a coefficient for its corresponding pixel in each of a plurality of masks; and
comparing the value obtained as a result of the operation with a predetermined threshold and determining whether the window is located at the edge.

25. The method of claim 24, wherein the performing of the operation comprises multiplying a coefficient for each pixel in each of a plurality of masks by a luminance value for its corresponding pixel in the window, adding the products together, calculating a difference between maximum and minimum values of a plurality of sums and determines the absolute value of the difference, and obtaining the result of the operation.

26. The method of claim 16, further comprising performing an operation on the corrected luminance value and on the corrected chrominance value for the edge and obtaining the corrected YCrCb domain for the edge.

27. A method for correcting an edge in an input image, comprising:
detecting edge the input image;
obtaining a corrected luminance value of a center pixel in a first window of a predetermined size on the edge of the input image by using weights assigned according to a luminance difference between the center pixel and a plurality of adjacent pixels to the center pixel or a difference in a predetermined value representing the degree of luminance uniformity between the center pixel and the plurality of adjacent pixels;
correcting an edge of the input image using the obtained corrected luminance value; and
displaying an edge corrected image,
wherein,
in the adjacent pixels are pixels in the first window other than the center pixel,
the obtaining of the corrected luminance value of the center pixel in the first window comprises calculating a luminance difference between the center pixel and the plurality of its adjacent pixels in the first window and assigning a predetermined weight to a first mask according to the luminance difference, and
in the assigning of the predetermined weight to the first mask, a low weight is assigned to an adjacent pixel having an absolute value of a luminance difference from the center pixel in the first window, which is greater than a predetermined threshold, and a high weight is assigned to an adjacent pixel having an absolute value of a luminance difference from the center pixel, which is less than the threshold, so that the adjacent pixels can affect the correction of a luminance value of the center pixel in the first window to a different degree.

* * * * *